United States Patent
Shapiro

(10) Patent No.: US 8,601,206 B1
(45) Date of Patent: Dec. 3, 2013

(54) METHOD AND SYSTEM FOR OBJECT-BASED TRANSACTIONS IN A STORAGE SYSTEM

(71) Applicant: Michael W. Shapiro, San Francisco, CA (US)

(72) Inventor: Michael W. Shapiro, San Francisco, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 13/826,792

(22) Filed: Mar. 14, 2013

(51) Int. Cl.
*G06F 12/00* (2006.01)

(52) U.S. Cl.
USPC .......................................... 711/105; 711/170

(58) Field of Classification Search
USPC ................................................. 711/105, 170
See application file for complete search history.

(56) References Cited

U.S. PATENT DOCUMENTS

| 7,543,100 | B2 | 6/2009 | Singhal et al. |
| 8,370,567 | B1 | 2/2013 | Bonwick et al. |

OTHER PUBLICATIONS

Kazmi, A., "PCI Express™ Basics & Applications in Communication Systems," PCI-SIG Developers Conference, 2004 (50 pages).
Percival, D., "Multicast Over PCT Express®," PCI-SIG Developer's Conference Europe, 2009 (33 pages).
Huffman, A., NVM Express Revision 1.0b, Jul. 12, 2011 (126 pages).
Regula, J., Using Non-transparent Bridging in PCI Express Systems, Jun. 1, 2004 (31 pages).

*Primary Examiner* — Matthew Bradley
(74) *Attorney, Agent, or Firm* — Osha Liang LLP

(57) ABSTRACT

A method including creating a transaction object for a transaction identified by a TOI and associated with an object identified by an OID, storing a TE and a MD frag for the transaction object, receiving a write request to write data to the transaction object, storing second TE including a TOI and offset and a data frag including the data, storing an entry including a hash value and a physical address of the data frag, and receiving a commit request to commit the transaction. In response to the commit request storing a third TE and a second MD frag for the transaction object, where the second MD frag identifies the object and specifies that the transaction is committed and updating a second entry including a second hash value and a second physical address for a second data frag to replace the second physical address with the physical address.

18 Claims, 18 Drawing Sheets

TOC Entry (230)

| Object ID 232 |
|---|
| Birth time 234 |
| Offset ID 236 |
| Fragment Size 238 |
| Page ID 240 |
| Byte 242 |
| Logical Length 244 |
| Type 246 |
| Other 248 |

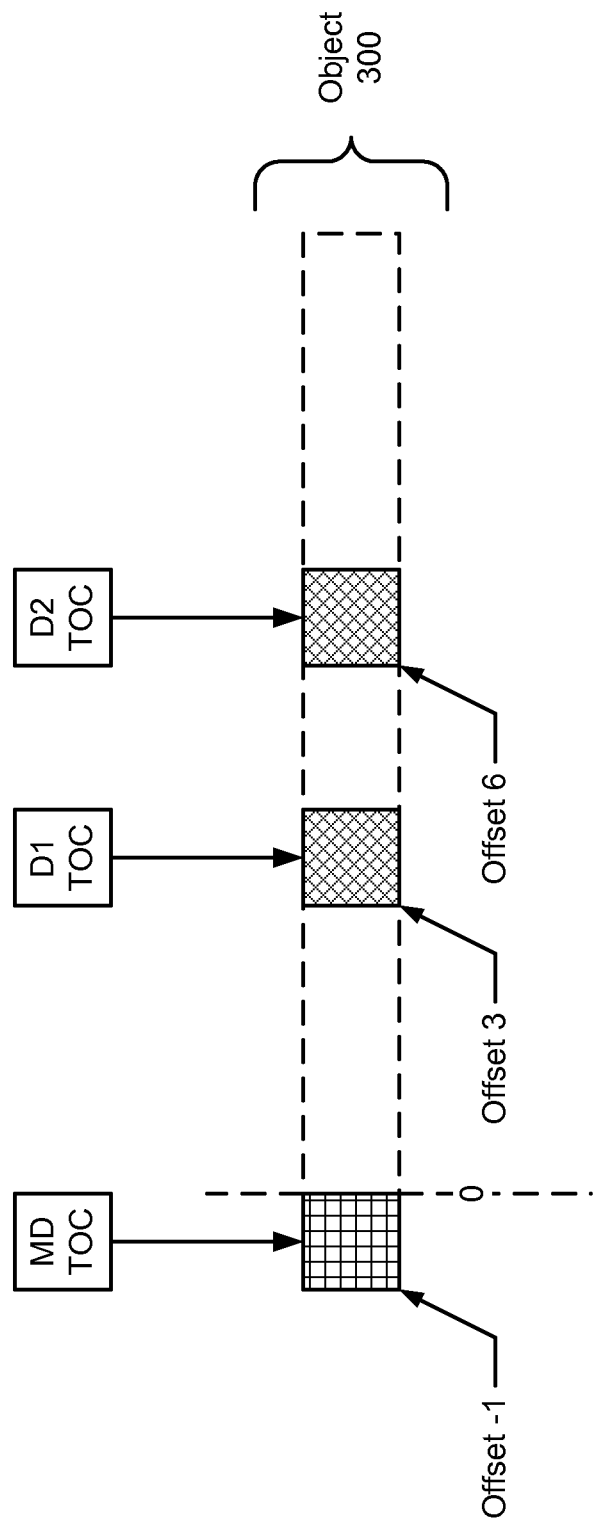

METHOD AND SYSTEM FOR OBJECT-BASED TRANSACTIONS IN A STORAGE SYSTEM

BACKGROUND

Applications typically require various datum to be atomically committed in a transaction. In an object storage system, a transaction is a set of logical storage locations (offsets) corresponding to an object that is to be modified, and new data to be written at each offset, where all of the new data will be visible, or none of it will visible if a failure occurs, but no other intermediate state with only a portion of the modifications is permitted. Traditional mechanisms for implementing transactions typically require the data that is part of the transaction to be written multiple times in order to commit the transaction resulting in a large processing overhead.

SUMMARY

In general, in one aspect, the invention relates to a non-transitory computer readable medium comprising instructions, which when executed by a processor, perform a method, the method comprising: creating a transaction object for a transaction, wherein the transaction object is identified by a transaction object ID (TOI) and associated with an object identified by an object ID (OID), storing, in persistent storage, a table of contents entry (TE) and a metadata (MD) frag for the transaction object, wherein TE references the MD frag and the MD frag identifies the object, receiving a write request to write data to the transaction object as part of the transaction, wherein the write request specifies the TOI and an offset, in response to the write request: storing, in the persistent storage, a second TE and a data frag, wherein the second TE specifies the TOI and offset, and wherein the second TE references the data frag and the data frag comprises the data, storing, in an in-memory data structure, an entry comprising a hash value and a physical address of the data frag, wherein the hash value is derived from the TOI and the offset, receiving a commit request to commit the transaction, in response to the commit request:

storing, in persistent storage, a third TE and a second metadata (MD) frag for the transaction object, wherein third TE references the second MD frag, wherein the second MD frag identifies the object and specifies that the transaction is committed, updating, in the in-memory data structure, a second entry comprising a second hash value and a second physical address for a second data frag to replace the second physical address with the physical address, wherein the second hash value is derived from the OID and the offset.

In general, in one aspect, the invention relates to a non-transitory computer readable medium comprising instructions, which when executed by a processor, perform a method, the method comprising: receiving a write request to write data as part of a transaction, wherein the write request specifies a transaction object ID (TOI) for a transaction object and an offset, and wherein the TOI is associated with an object identified by an object ID (OID), in response to the write request: storing, in persistent storage, a TE and a data frag, wherein TE specifies the TOI and the offset, wherein the TE references the data frag and the data frag comprises the data, storing, in an in-memory data structure, an entry comprising a hash value and a physical address of the data frag, wherein the hash value is derived from the TOI and the offset, receiving a second write request to write second data as part of a second transaction, wherein the second write request specifies the second TOI for a second transaction object and a second offset and wherein the second TOI is associated with a second object identified by a second OID, in response to the second write request: storing, in the persistent storage, a second TE and a second data frag, wherein second TE specifies the second TOI and the second offset, wherein the second TE references the second data frag and the second data frag comprises the second data, storing, in an in-memory data structure, a second entry comprising a second hash value and a second physical address of the second data frag, wherein the second hash value is derived from the second TOI and the second offset, receiving a commit request, wherein the commit request comprises the TOI and the second TOI, in response to the commit request: storing, in persistent storage, a third TE and a compound frag, wherein third TE references the compound frag, wherein the compound frag comprises a fourth TE and a fifth TE, wherein the fourth TE references a MD frag, wherein the MD frag identifies the TOI and specifies that the transaction is committed, wherein the fifth TE references a second MD frag, wherein the second MD frag identifies the second TOI and specifies that the second transaction is committed, updating, in the in-memory data structure, a third entry comprising a third hash value and a third physical address for a third data frag to replace the third physical address with the physical address, wherein the third hash value is derived from the OID and the offset, updating, in the in-memory data structure, a fourth entry comprising a fourth hash value and a fourth physical address for a fourth data frag to replace the fourth physical address with the second physical address, wherein the fourth hash value is derived from the second OID and the second offset.

Other aspects of the invention will be apparent from the following description and the appended claims.

BRIEF DESCRIPTION OF DRAWINGS

FIG. 3 shows an object and corresponding TOC entries in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7D, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for implementing transactions in a storage system. More specifically, embodiments of the invention use transaction objects to implement the transaction, where each transaction only requires updated datum/data to be written once to the persistent storage. In one embodiment of the invention, the transactions may be associated with a single object (see e.g., FIGS. 4 and 6A-6D) or multiple objects (see e.g., FIGS. 5A-5C and 7A-7D). Further, embodiments of the invention allow a single copy of the data to represent the transaction during all intermediate states and following a transaction commit.

Figure 1:
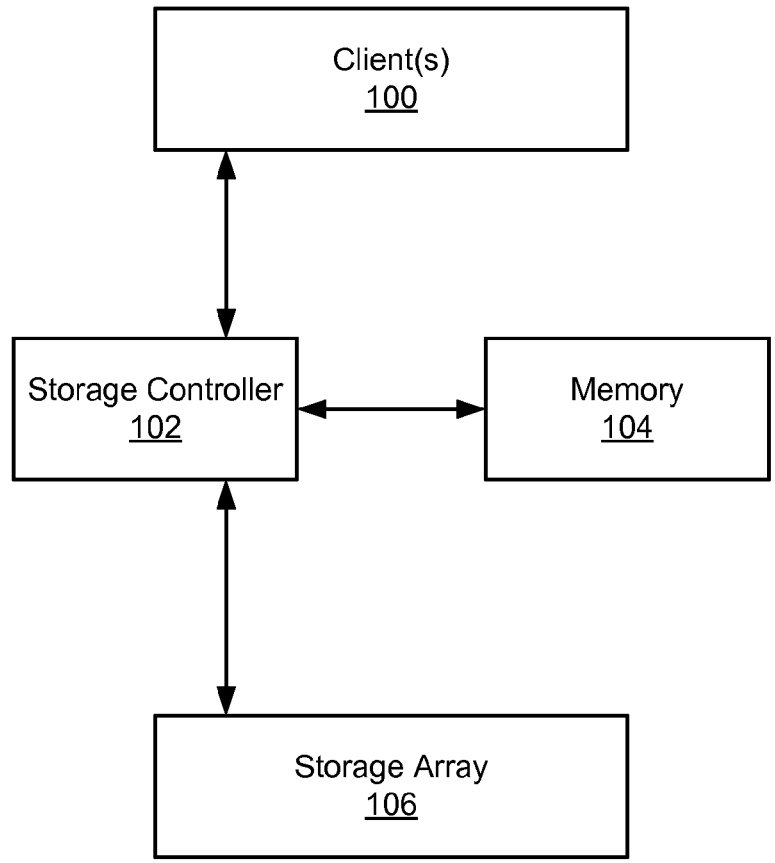
FIG. 1 shows a system in accordance with one or more embodiments of the invention.

FIG. 1 shows a system in accordance with one embodiment of the invention. As shown in FIG. 1, the system includes one or more clients (100), a storage controller (102), memory (104), and a storage array (106).

In one embodiment of the invention, a client (100) is any system or process executing on a system that includes functionality to issue a read request, a write request, or a commit request (with one or more transaction objects) to the storage controller (102). In one embodiment of the invention, the clients (100) may each include a processor (not shown), memory (not shown), and persistent storage (not shown). In one embodiment of the invention, the storage controller (102) is operatively connected to one or more clients (100) and is configured to implement the transaction object scheme, which includes writing table of contents entries and frags to the storage array in a manner consistent with the transaction object scheme described below (see e.g., FIG. 4-5C). In one embodiment of the invention, the storage controller (102) includes a processor (not shown) configured to execute instructions to implement one or more embodiments of the invention, where the instructions are stored on a non-transitory computer readable medium (not shown) that is located within or that is operatively connected to the storage controller (102). Alternatively, the storage controller (102) may be implemented using hardware. The storage controller (102) may be implemented using any combination of software and/or hardware without departing from the invention.

In one embodiment of the invention, the storage controller (102) is operatively connected to memory (104). The memory (104) may be any volatile memory including, but not limited to, Dynamic Random-Access Memory (DRAM), Synchronous DRAM, SDR SDRAM, and DDR SDRAM. In one embodiment of the invention, the memory (104) is configured to temporarily store various data (including data for table of contents entries and frags) prior to such data being stored in the storage array.

In one embodiment of the invention, the storage array (106) includes a number of individual persistent storage devices including, but not limited to, magnetic memory devices, optical memory devices, solid-state memory devices, phase change memory devices, any other suitable type of persistent memory device, or any combination thereof.

System configurations other than the one shown in FIG. 1 may be used without departing from the invention.

Figure 2D:
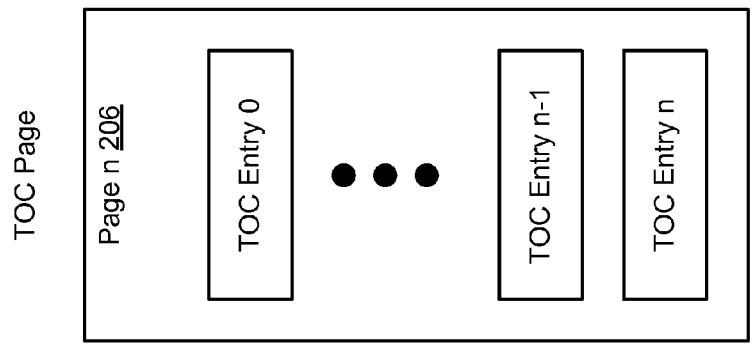
FIG. 2D shows a TOC page in accordance with one or more embodiments of the invention.
Figure 2C:
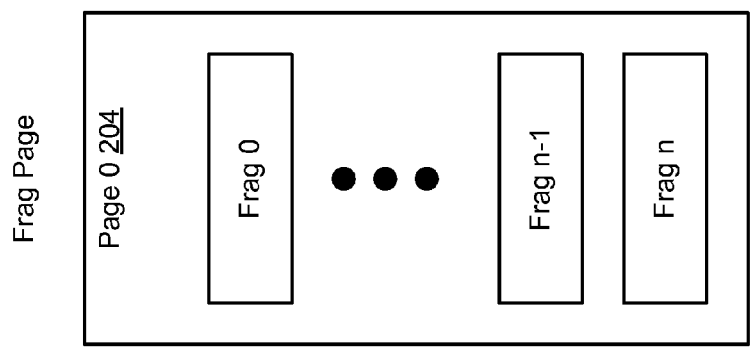
FIG. 2C shows a frag page in accordance with one or more embodiments of the invention.

As described above, the storage array may include solid-state memory devices. The following discussion describes embodiments of the invention implemented using solid-state memory devices. Turning to FIG. 2A, FIG. 2A shows a solid-state memory module of a solid-state memory device (not shown) in accordance with one or more embodiments of the invention. The solid-state memory device (not shown) may include multiple solid-state memory modules. The solid-state memory module (200) includes one or more blocks. In one embodiment of the invention, a block is the smallest erasable unit of storage within the solid-state memory module (200).

Figure 2B:
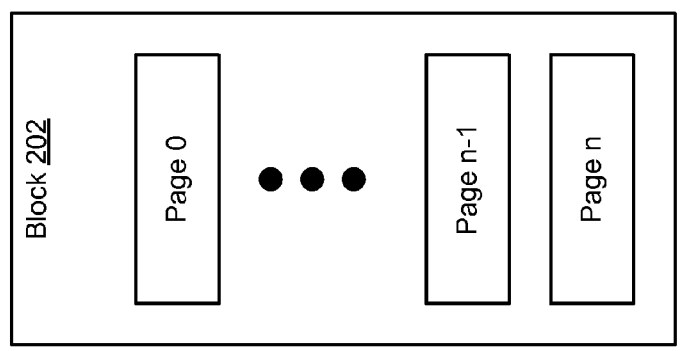
FIG. 2B shows a block in accordance with one or more embodiments of the invention.
Figure 2A:
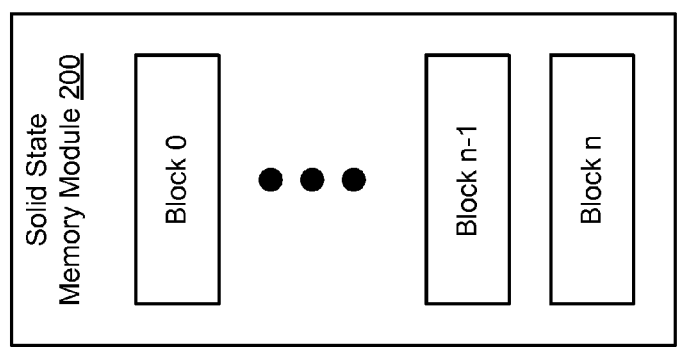
FIG. 2A shows a solid-state memory module in accordance with one or more embodiments of the invention.

FIG. 2B shows a block in accordance with one or more embodiments of the invention. More specifically, each block (202) includes one or more pages. In one embodiment of the invention, a page is the smallest addressable unit for read and program operations (including the initial writing to a page) in the solid-state memory module. In one embodiment of the invention, rewriting a page within a block requires the entire block to be rewritten. In one embodiment of the invention, each page within a block is either a Frag Page (see FIG. 2C) or a TOC Page (see FIG. 2D).

FIG. 2C shows a frag page in accordance with one or more embodiments of the invention. In one embodiment of the invention, the frag page (204) includes one or more frags. In one embodiment of the invention, a frag corresponds to a finite amount of user data (or metadata if the frag page is a metadata frag (see FIG. 2H) or TOC entries if the frag is a compound frag (see FIG. 2I)). Further, the frags within a given page may be of a uniform size or of a non-uniform size. Further, frags within a given block may be of a uniform size or of a non-uniform size. In one embodiment of the invention, a given frag may be less than the size of a page, may be exactly the size of a page, or may extend over one or more pages. In one embodiment of the invention, a frag page only includes frags. In one embodiment of the invention, each frag includes user data (i.e., data provided by the client for storage in the storage appliance) (see FIG. 2G), metadata for an object (see FIG. 2H) or TOC entries, if the frag is a compound frag (see FIG. 2I). A given frag page may include a frags of a single type or frags of two or more types.

FIG. 2D shows a TOC page in accordance with one or more embodiments of the invention. In one embodiment of the invention, the TOC page (206) includes one or more TOC entries, where each of the TOC entries includes metadata for a given frag. In addition, the TOC page (206) may include a reference to another TOC page in the block (202). In one embodiment of the invention, a TOC page only includes TOC entries (and, optionally, a reference to another TOC page in the block), but does not include any frags. In one embodiment of the invention, each TOC entry corresponds to a frag (see FIG. 2C) in the block (202). The TOC entries only correspond to frags within the block. Said another way, the TOC page is associated with a block and only includes TOC entries for frags in that block. In one embodiment of the invention, the last page that is not defective in each block within each of the solid-state memory modules is a TOC page.

Figure 2E:
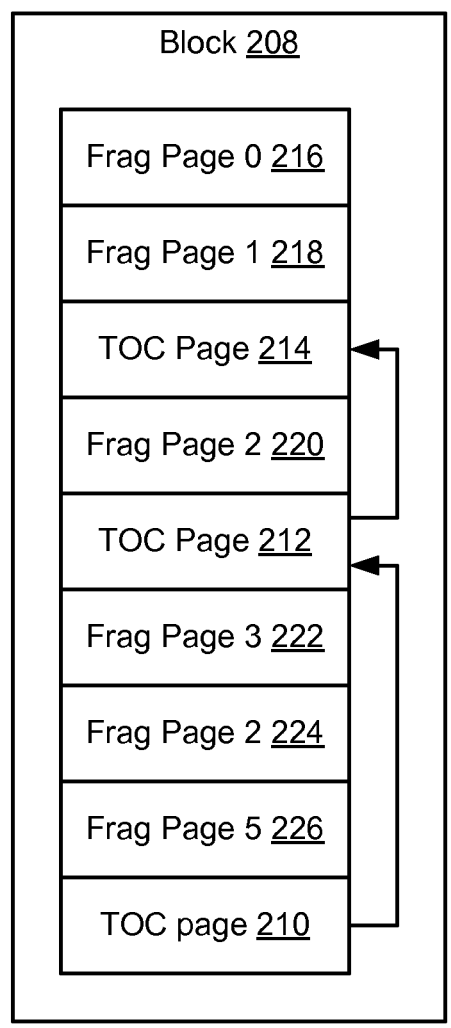
FIG. 2E shows a block in accordance with one or more embodiments of the invention.

FIG. 2E shows a block in accordance with one or more embodiments of the invention. More specifically, FIG. 2E shows a block (208) that includes TOC pages (210, 212, 214) and frag pages (216, 218, 220, 222, 224, 226). In one embodiment of the invention, the block (208) is conceptually filled from "top" to "bottom." Further, TOC pages are generated and stored once the accumulated size of the TOC entries for the frags in the frag pages equal the size of a page. Turning to FIG. 2E, for example, frag page 0 (216) and frag page 1 (218) are stored in the block (208). The corresponding TOC entries (not shown) for the frags (not shown) in frag page 0 (216) and frag page 1 (218) have a total cumulative size equal to the size of a page in the block. Accordingly, a TOC page (212) is generated (using the TOC entries corresponding to frags in the block) and stored in the block (208). Frag page 2 (220) is subsequently written to the block (208). Because the TOC entries corresponding to the frags (not shown) in frag page 2 (220) have a total cumulative size equal to the size of a page in the block, TOC page (212) is created and stored in the block (208). Further, because there is already a TOC page in the block (208), TOC page (212) also includes a reference to TOC page (214).

This process is repeated until there is only one page remaining in the block (208) to fill. At this point, a TOC page (210) is created and stored in the last page of the block (208). Those skilled in the art will appreciate that the total cumulative size of the TOC entries in the TOC page (210) may be less than the size of the page. In such cases, the TOC page may include padding to address the difference between the cumulative size of the TOC entries and the page size. Finally, because there are other TOC pages in the block (208), TOC page (210) includes a reference to one other TOC page (212).

As shown in FIG. 2E, the TOC pages are linked from the "bottom" of the block to "top" of the page, such that the TOC page may be obtained by following a reference from a TOC page that is "below" the TOC page. For example, TOC page (212) may be accessed using the reference in TOC page (210).

Those skilled in the art will appreciate that while block (208) only includes frag pages and TOC pages, block (208) may include pages (e.g., a page that includes parity data) other than frag pages and TOC pages without departing from the invention. Such other pages may be located within the block and, depending on the implementation, interleaved between the TOC pages and the frag pages.

Figure 2F:
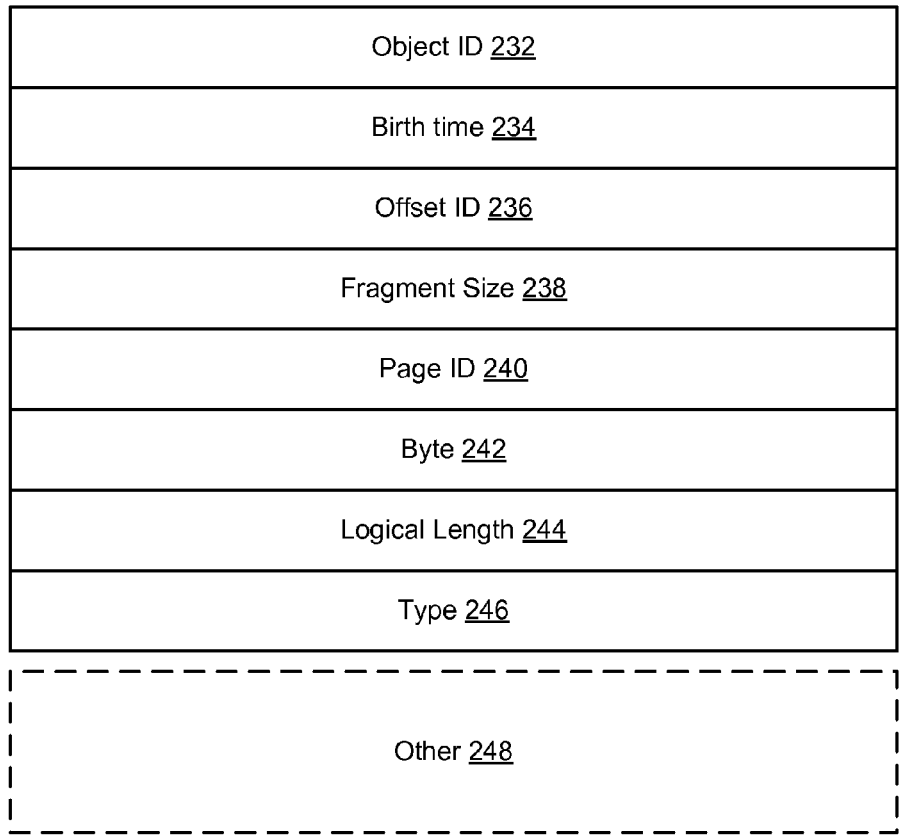
FIG. 2F shows a table of contents (TOC) entry in accordance with one or more embodiments of the invention.

FIG. 2F shows a TOC entry in accordance with one or more embodiments of the invention. In one embodiment of the invention, each TOC entry (230) includes metadata for a frag and may include one or more of the following fields: (i) object ID (232), which identifies the object being stored; (ii) the birth time (234), which specifies the time (e.g., the processor clock value of the processor in the control module) at which the frag corresponding to the TOC entry was written to the storage array; (iii) offset ID (236), which identifies a point in the object relative to the beginning of the object (identified by the object ID); (iv) fragment size (238), which specifies the size of the frag; (v) page ID (240), which identifies the page in the block in which the frag is stored; (vi) byte (242), which identifies the starting location of the frag in the page (identified by the page ID); (vii) logical length (244), which specifies the non-compressed length of the user data in the frag; and (viii) type (246), which specifies the type of data in the frag (e.g., object, compound frag, etc.). The TOC entry (230) may include other fields (denoted by other (248)) without departing from the invention.

In one embodiment of the invention, the <object ID, offset ID> or <object ID, offset ID, birth time> identify data, for example, that is provided by the client. Further, the <object ID, offset ID> or <object ID, offset ID, birth time> may be used by the client to identify particular data, while the storage appliance uses a physical address(es) to identify data within the storage appliance. Those skilled in the art will appreciate that the client may provide a logical address instead of the object ID and offset ID.

Those skilled in the art will appreciate that the TOC entry may include additional or fewer fields than shown in FIG. 2F without departing from the invention. Further, the fields in the TOC entry may be arranged in a different order and/or combined without departing from the invention. In addition, while the fields in the TOC entry shown in FIG. 2F appear to all be of the same size, the size of various fields in the TOC entry may be non-uniform, with the size of any given field varying based on the implementation of the TOC entry.

Figure 2I:
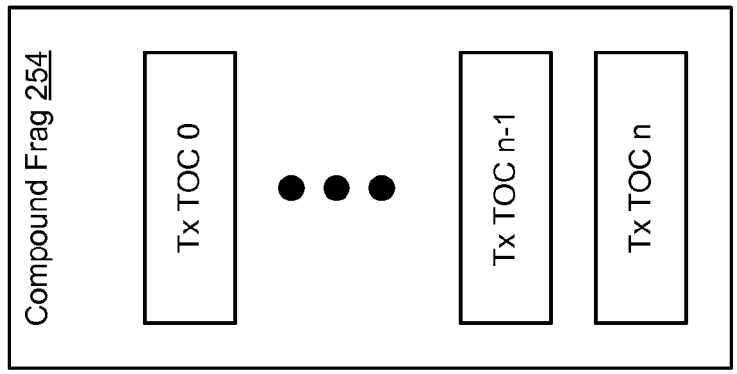
FIG. 2I shows a compound frag in accordance with one or more embodiments of the invention.
Figure 2H:
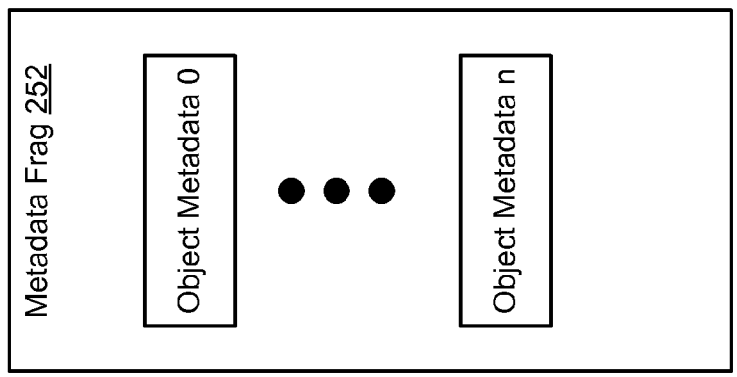
FIG. 2H shows a metadata frag in accordance with one or more embodiments of the invention.
Figure 2G:
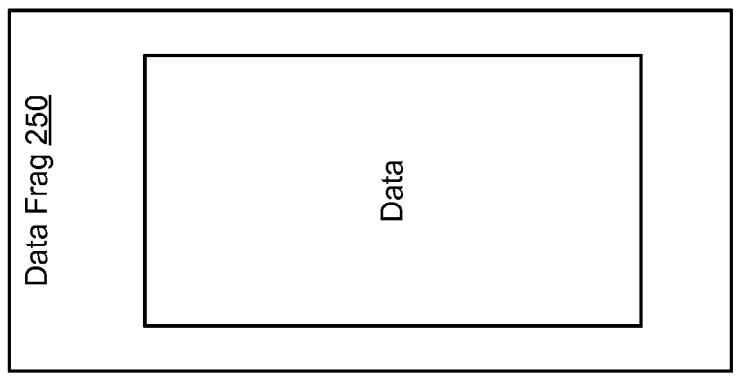
FIG. 2G shows a data frag in accordance with one or more embodiments of the invention.

FIG. 2G shows a data frag in accordance with one or more embodiments of the invention. The data frag (250) only includes data from the client. For example, the data in the data frag may correspond to data in a file, where the file is identified by the object ID.

FIG. 2H shows a metadata frag in accordance with one or more embodiments of the invention. The metadata frag (252) includes object metadata for the object corresponding to the object ID in the TOC entry associated with the metadata frag. Said another way, the metadata for the object is stored in a metadata frag and associated with a TOC entry that includes the object ID for the object and offset=−1. Values other than −1 may be used without departing from the invention. Examples of object metadata may include, but are not limited to, the object type, its maximum size, its creation time, its most recent modification time, and other per-object attributes. In one embodiment of the invention, there is one metadata frag for each object in the storage array.

FIG. 2I shows a compound frag in accordance with one or more embodiments of the invention. In one embodiment of the invention, the compound frag (254) unlike other frags does not include data from a client or metadata for an object; rather, the compound frag (254) includes two or more TOC entries, where each of the TOC entries is associated with a transaction object and has an offset=−1. In one embodiment of the invention, all transaction objects specified in the TOC entries in the compound frag belong to a single transaction.

FIG. 3 shows an object (300) and corresponding TOC entries in accordance with one or more embodiments of the invention. More specifically, FIG. 3 shows the conceptual view of an object and corresponding TOC entries in accordance with one embodiment of the invention. As shown in FIG. 3, the object (300) includes a metadata frag located at offset −1, which includes metadata for the object. Further, the object includes two pieces of data (stored in one or more frag pages, not shown) located at offsets 3 and 6. Each of the aforementioned frags is associated with a TOC entry (stored in one or more TOC pages, not shown).

Figure 4:
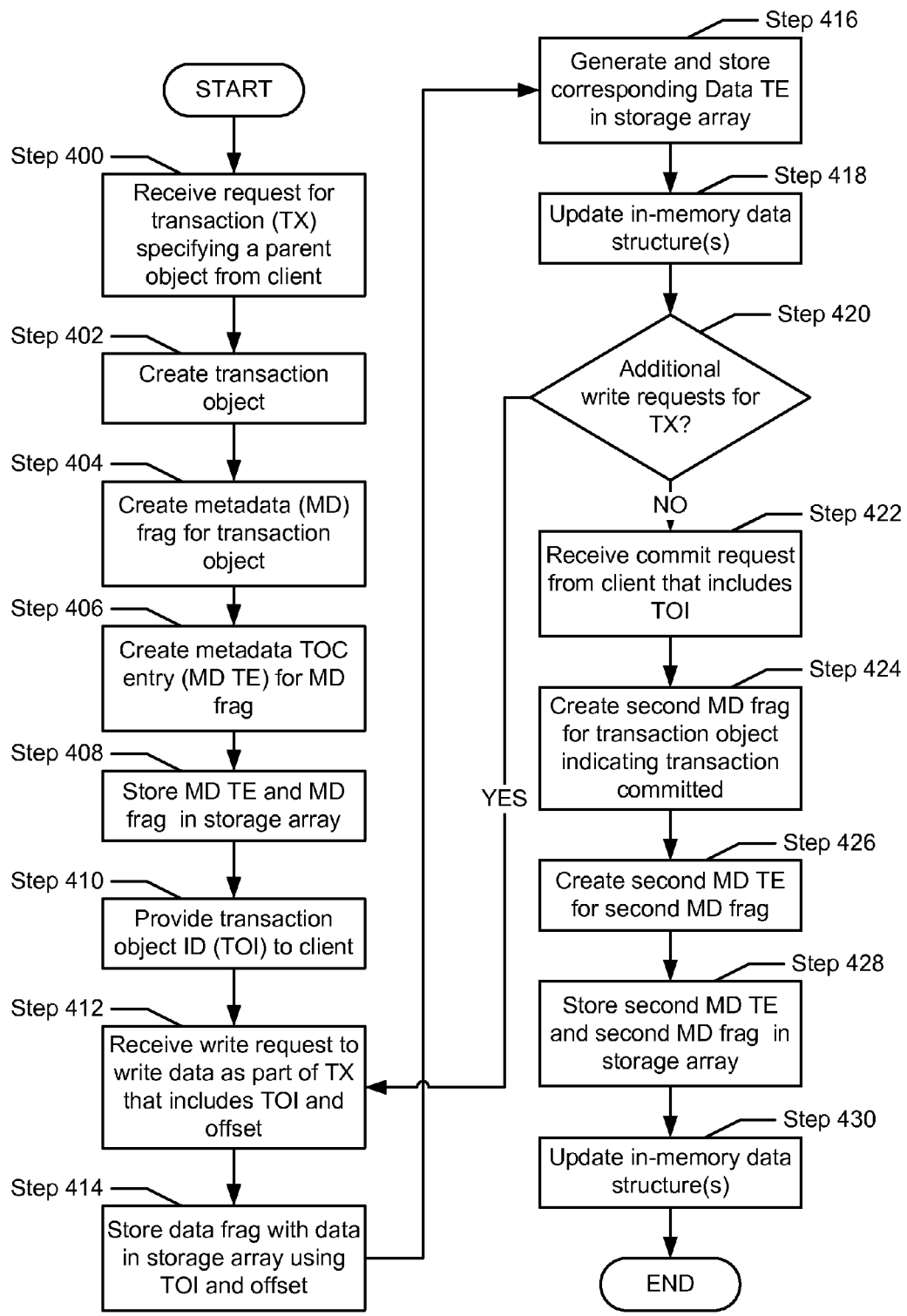
FIG. 4 shows a flowchart for performing a single object transaction in accordance with one or more embodiments of the invention.
Figure 5A:
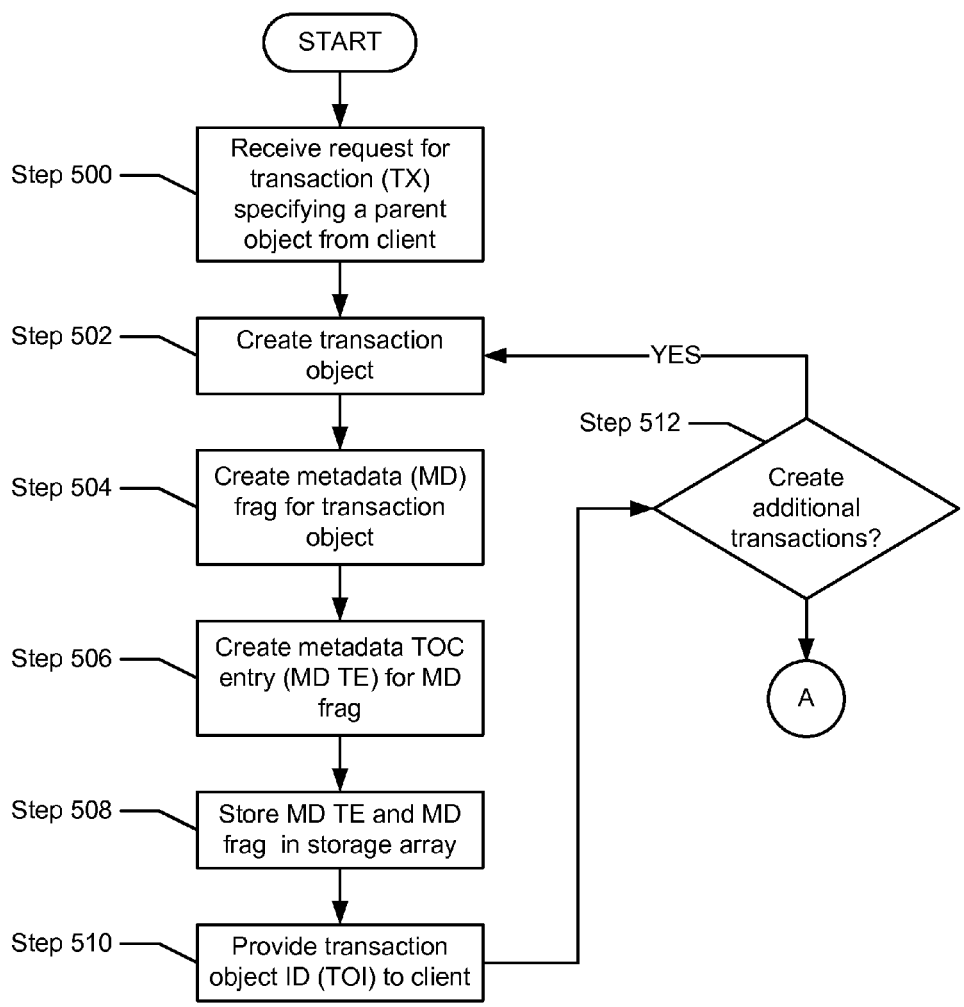
FIGS. 5A-5C show a flowchart for performing a multi-object transaction in accordance with one or more embodiments of the invention.
Figure 5B:
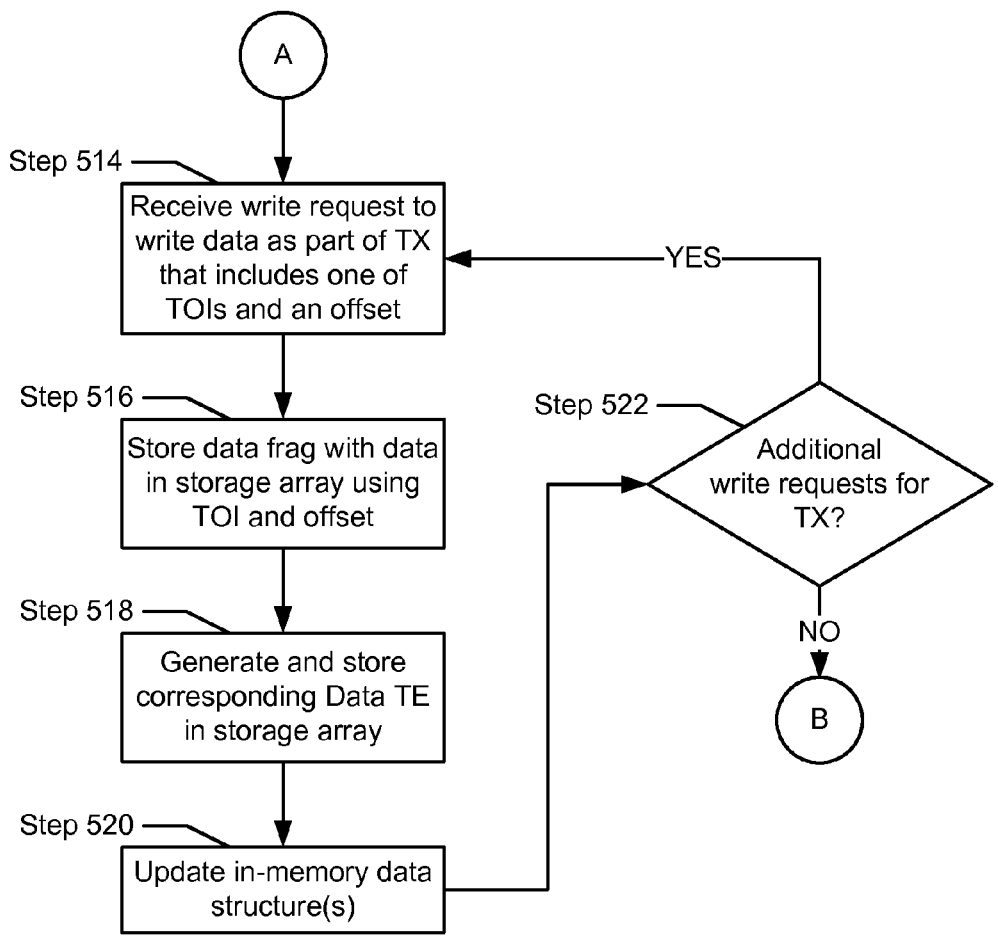
Figure 5C:
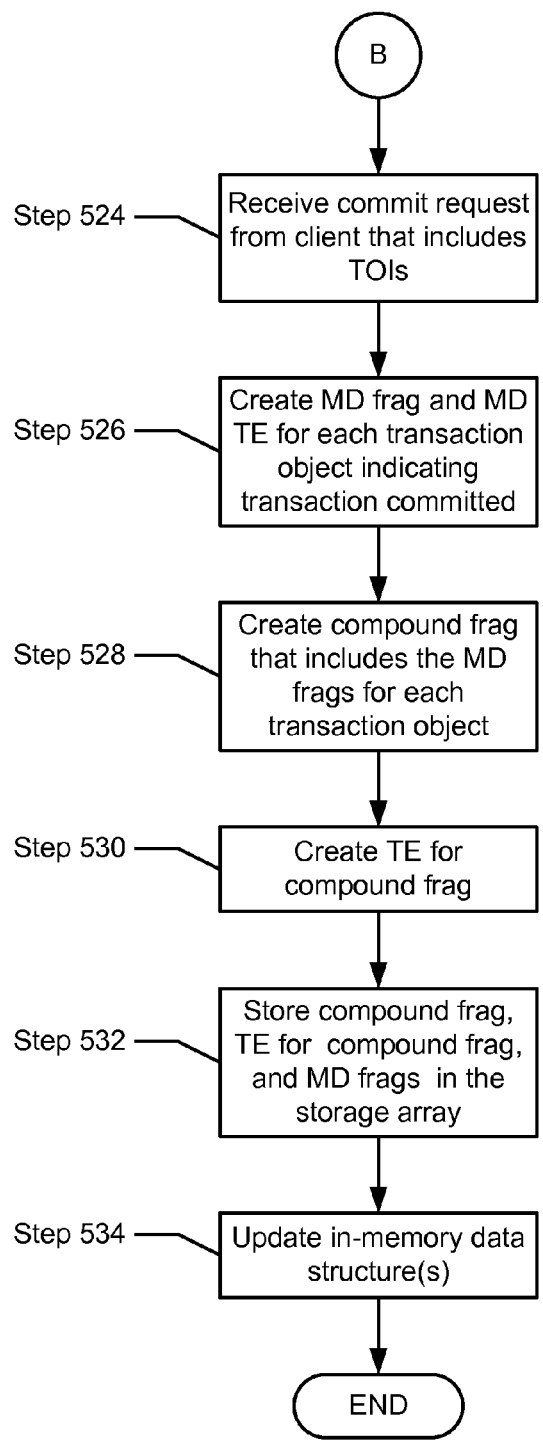

FIGS. 4-5C show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 4-5C may be performed in parallel with any other steps shown in FIGS. 4-5C without departing from the invention.

Turning to FIG. 4, FIG. 4 shows a flowchart for performing a single object transaction in accordance with one or more embodiments of the invention. In Step 400, a request for a transaction is received by the storage controller, where the request specifies a parent object. The parent object corresponds to the object on which the transaction is to be performed. (See e.g., FIG. 6A, parent object is object with object ID=A).

In Step 402, a transaction object is created for the transaction. Creating the transaction objection may include specifying an object ID for the transaction. In Step 404, a metadata (MD) frag is created for the transaction object. The metadata frag may include the transaction object ID (TOI), the object ID for the parent object, and a field indicating that the transaction is not committed. The metadata frag may also include other metadata for the transaction object.

In Step 406, a table of contents (TOC) entry (referred to as MD TE) is created for the metadata frag. The MD TE includes the TOI and an offset=−1. The MD TE may include other information without departing from the invention. In Step 408, the MD frag and MD TE are subsequently stored in the storage array. In one embodiment of the invention, the MD frag is stored in the storage array as part of a frag page and the MD TE is stored in the storage array as part of a TOC page. The timing of the writing aforementioned frags, TEs and pages, may vary based on how embodiments of the invention are implemented.

In Step 410, the TOI is provided to the client that initiated the transaction. The TOI may be provided to other clients that are participating in the transaction without departing from the invention. In Step 412, a write request to write data as part of the transaction is received. The write request includes the TOI and an offset.

In Step 414, a data frag with the data identified in the write request is stored in the storage array (typically as part of a frag page). In Step 416, a TE for the data frag (stored in Step 414) is created and stored in the storage array (typically as part of a TOC page). The TE for the data frag includes the TOI and the offset. The TE does not include the object ID for the parent object.

In Step 418, an in-memory data structure is updated to include an entry that includes (i) a hash value derived from the TOI and offset and (ii) the physical address of the data frag stored in step 414. In one embodiment of the invention, the hash value may be derived by applying a function (e.g., MD5, SHA 1, etc.) to <TOI, offset> (or to a value generated using TOI and offset). Those skilled in the art will appreciate that any injective function may be used without departing from the invention. Returning to FIG. 4, at this stage the storage controller can process a read request that includes the TOI and the offset and a read request that includes the object ID of the parent object and the offset. The results of servicing the aforementioned read requests will typically result in obtaining two different datum—one corresponding to <TOI, Offset> and one corresponding to <Parent Object ID, offset>, where the offsets are the same.

In Step 420, a determination is made about whether there are additional write requests for the transaction. If there are additional write requests for the transaction the process proceeds to Step 412; otherwise, the process proceeds to step 422. In Step 422, a commit request specifying the TOI is received from the client. In Step 424, a second MD frag is created for the transaction object that includes the transaction object ID (TOI), the object ID for the parent object, and a field indicating that the transaction is committed.

In Step 426, a second MD TE is created where the second MD TE includes the TOI and offset=−1. Steps 424 and 426 are performed when the storage array and/or storage controller implements a copy-on-write scheme. If the storage array and/or storage controller do not implement a copy-on-write scheme, then steps 424 and 426 may not be performed; rather the MD TE and MD frag created in steps 404 and 406 may be updated to include the information to include the same information as the MD TE and MD frag created in Steps 424 and 426, respectively.

In Step 428, the second MD frag is stored in the storage array (typically in a frag page) and the second MD TE is stored in the storage array (typically in a TOC page). In Step 430, the in-memory data structure is updated to reflect that the transaction is committed. Specifically, in one embodiment of the invention, an entry that includes a hash value derived from the parent object ID and the offset is updated to include the physical address of data, where the physical address was previously present in an another entry (i.e., an entry created in Step 418) that includes the TOI and the offset. If more than one write request was received and processed in the transaction (see Steps, 412-420), then multiple entries in the in-memory data structure are updated. At this stage, the controller can service read requests using <parent object ID, offset> but cannot service any requests specifying the TOI. Further, when a read request including <parent object ID, offset> is received where the offset corresponds to an offset received in a write request in Step 412, the result is the data that was stored in the data frag in step 414.

Turning to FIGS. 5A-5C, FIGS. 5A-5C show a flowchart for performing a multi-object transaction in accordance with one or more embodiments of the invention. In one embodiment of the invention, FIGS. 5A-5C show a method for implementing transactions that are related to multiple objects, where each object is associated with its own transaction object. As described below, each object and corresponding transaction object may operate independently of any other object and corresponding transaction object until the overall transaction (that includes multiple objects) is committed. Accordingly, in the discussion below, a "transaction" may refer to either a transaction that involves a single transaction object or a transaction that involves multiple transaction objects.

Turning to FIG. 5A, in Step 500, a request for a transaction is received by the storage controller, where the request specifies a parent object. The parent object corresponds to the object on which the transaction is to be performed. (See e.g., FIG. 7A, parent object is object with object ID=A). In Step 502, a transaction object is created for the transaction. Creating the transaction object may include specifying an object ID for the transaction. In Step 504, a metadata (MD) frag is created for the transaction object. The metadata frag may include the transaction object ID (TOI), the object ID for the parent object, and a field indicating that the transaction is not committed. The metadata frag may also include other metadata for the transaction object.

In Step 506, a table of contents (TOC) entry (referred to as MD TE) is created for the metadata frag. The MD TE includes the TOI and an offset=−1. The MD TE may include other information without departing from the invention. In Step 508, the MD frag and MD TE are subsequently stored in the storage array. In one embodiment of the invention, the MD frag is stored in the storage array as part of a frag page and the MD TE is stored in the storage array as part of a TOC page.

The timing of the writing of the aforementioned frags, TEs and pages, may vary based on how embodiments of the invention are implemented.

In Step 510, the TOI is provided to the client that initiated the transaction. The TOI may be provided to other clients that are participating in the transaction without departing from the invention. In Step 512, a determination is made about whether there are additional transactions to create. If so, the process proceeds to step 502; otherwise the process proceeds to step 514. In Step 514, a write request to write data as part of one of the transactions is received. The write request includes the TOI and an offset. The TOI may correspond to any TOI created during an iteration of step 502. In Step 516, a data frag with the data identified in the write request is stored in a data frag in the storage array (typically as part of a frag page). In Step 518, a TE for the data frag (stored in Step 516) is created and stored in the storage array (typically as part of a TOC page). The TE for the data frag includes the TOI and the offset. The TE does not include the object ID for the parent object.

In Step 520, an in-memory data structure is updated to include an entry that includes (i) a hash value derived (as discussed above in FIG. 4) from the TOI and offset and (ii) the physical address of the data frag stored in step 516. At this stage the storage controller can process a read request that includes the TOI and the offset and a read request that includes the object ID of the parent object and the offset. The results of servicing the aforementioned read requests will typically result in obtaining two different datum—one corresponding to <TOI, Offset> and one corresponding to <Parent Object ID, offset>, where the offsets are the same. In Step 522, a determination is made about whether there are additional write requests for any of the transactions (i.e., write requests that specify one of the TOIs created during any iteration of Step 502). If there are additional write requests for any of the transactions the process proceeds to Step 514; otherwise, the process proceeds to step 524.

In Step 524, a commit request specifying two or more TOIs is received from the client(s). The TOIs correspond to the transactions created in Step 502. In Step 526, a second MD frag is created for each transaction object (i.e., transaction objects corresponding to transactions created in Step 502) that includes the corresponding transaction object ID (TOI), the corresponding object ID for the parent object, and a field indicating that the transaction is committed. In addition, a second MD TE is created for each of the aforementioned second MD frags, where the second MD TEs include the corresponding TOI and offset=−1. Step 526 is performed when the storage array and/or storage controller implements a copy-on-write scheme. If the storage array and/or storage controller do not implement a copy-on-write scheme, step 526 may not be performed; rather the MD TE and MD frag created in steps 504 and 506 may be updated to include the information to include the same information as the MD TE and MD frag created in Steps 424 and 426, respectively.

In Step 528, a compound frag is created where the compound frag is associated with a compound object and includes the MD TEs created in Step 526. In Step 530, a TE for the compound frag is created. The TE for the compound frag includes an object ID for the compound frag and an offset=−1. The TE for the compound frag may also indicate that the frag referenced by the compound TE is a compound frag. In Step 532, the compound frag, the TE for the compound frag, and the MD frags (created in Step 526) are stored in the storage array. The compound frag and MD frags are stored in one or more frag pages and the TE for the compound frag is stored in a TOC page. In one embodiment of the invention, the storing of the compound frag implicitly indicates that all transactions specified in the compound frag (via transaction object IDs) have been committed.

In Step 534, the in-memory data structure is updated to reflect that the transactions are committed. Specifically, in one embodiment of the invention, multiple entries in the in-memory data structure are updated in the manner discussed above with respect to Step 430 in FIG. 4.

FIGS. 6A-6D show an example in accordance with one or more embodiments of the invention. The example is not intended to limit the scope of the invention.

Figure 6A:
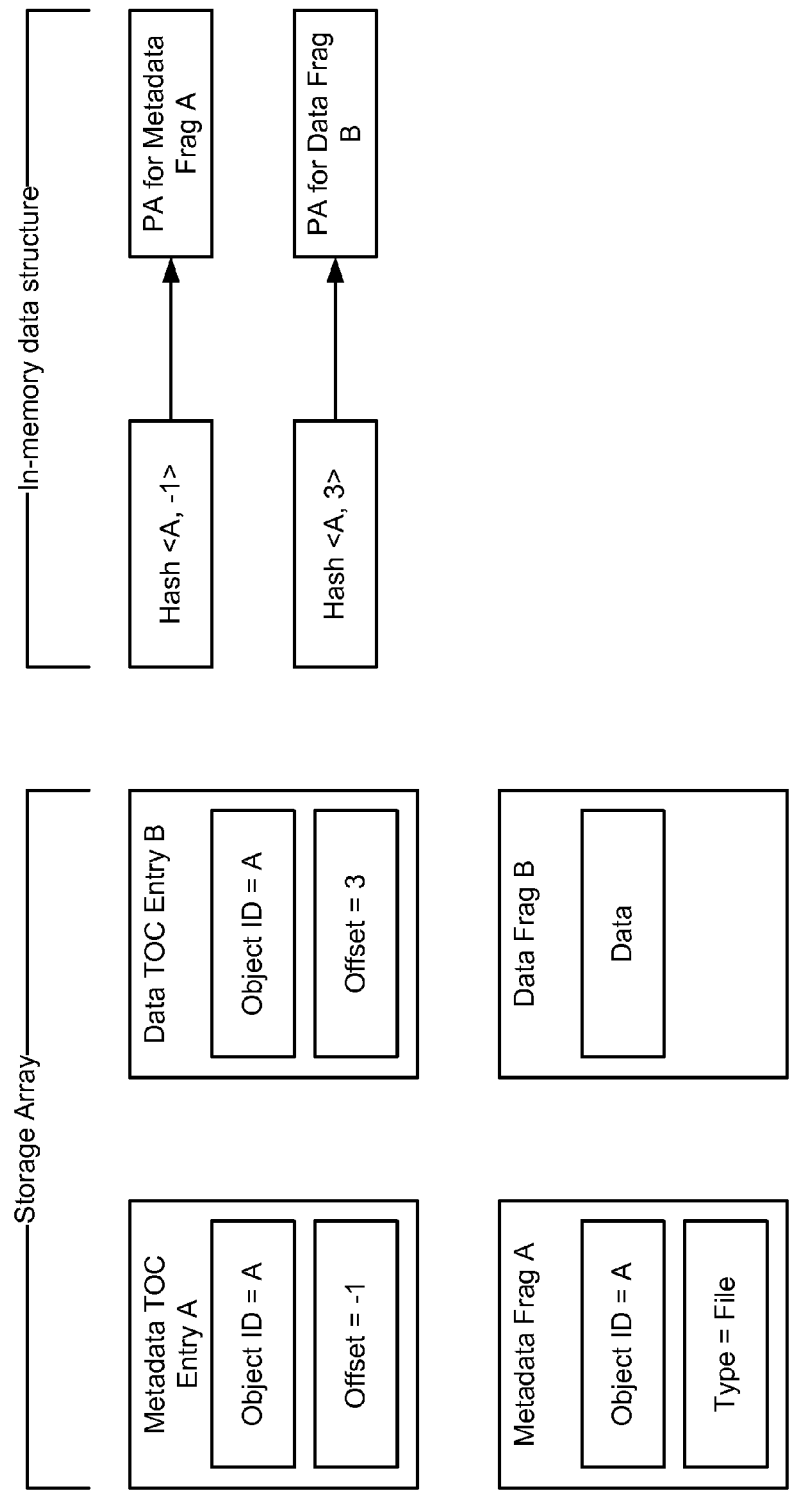
FIGS. 6A-6D show an example in accordance with one or more embodiments of the invention.

Referring to FIG. 6A, consider the scenario in which there is an object with object ID=A in the storage array. More specifically, there is a MD TOC entry for the object and a corresponding MD frag for the object, where the MD frag is accessible via hash<A, −1>. Further, there is a data frag (data frag B) that includes data for the object, where the data is associated with <A, 3>. The aforementioned object ID and offset are stored in a corresponding data TE (Data TOC Entry B) in the storage array. At this stage there are four items in the storage array and two entries in the in-memory data structure. Each of the entries in the in-memory data structure points to one of the aforementioned frags.

Figure 6B:
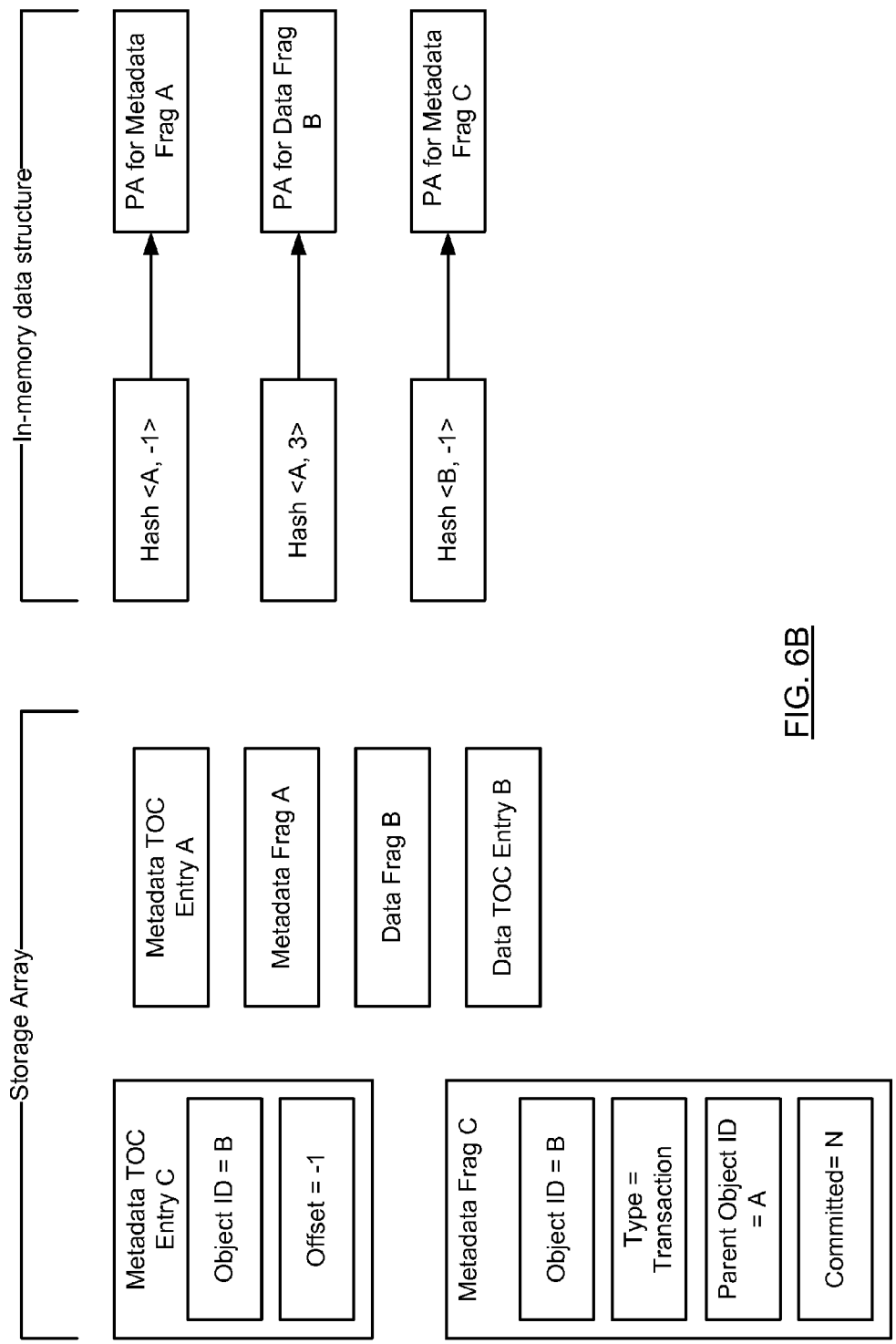

Referring to FIG. 6B, consider a scenario in which a client requests a transaction specifying object ID=B. In this scenario, a MD frag (metadata frag C) is created and stored in the storage array, where the MD frag specifies that the transaction object ID=B, that type of object B is a transaction, that the parent Object ID=A, and that the transaction is not committed. A corresponding MD TE (metadata TOC entry C) is also created and stored in the storage array, where the MD TE specifies object ID=B and offset=−1. A corresponding entry for metadata frag C is also created and stored in the in-memory data structure.

Figure 6C:
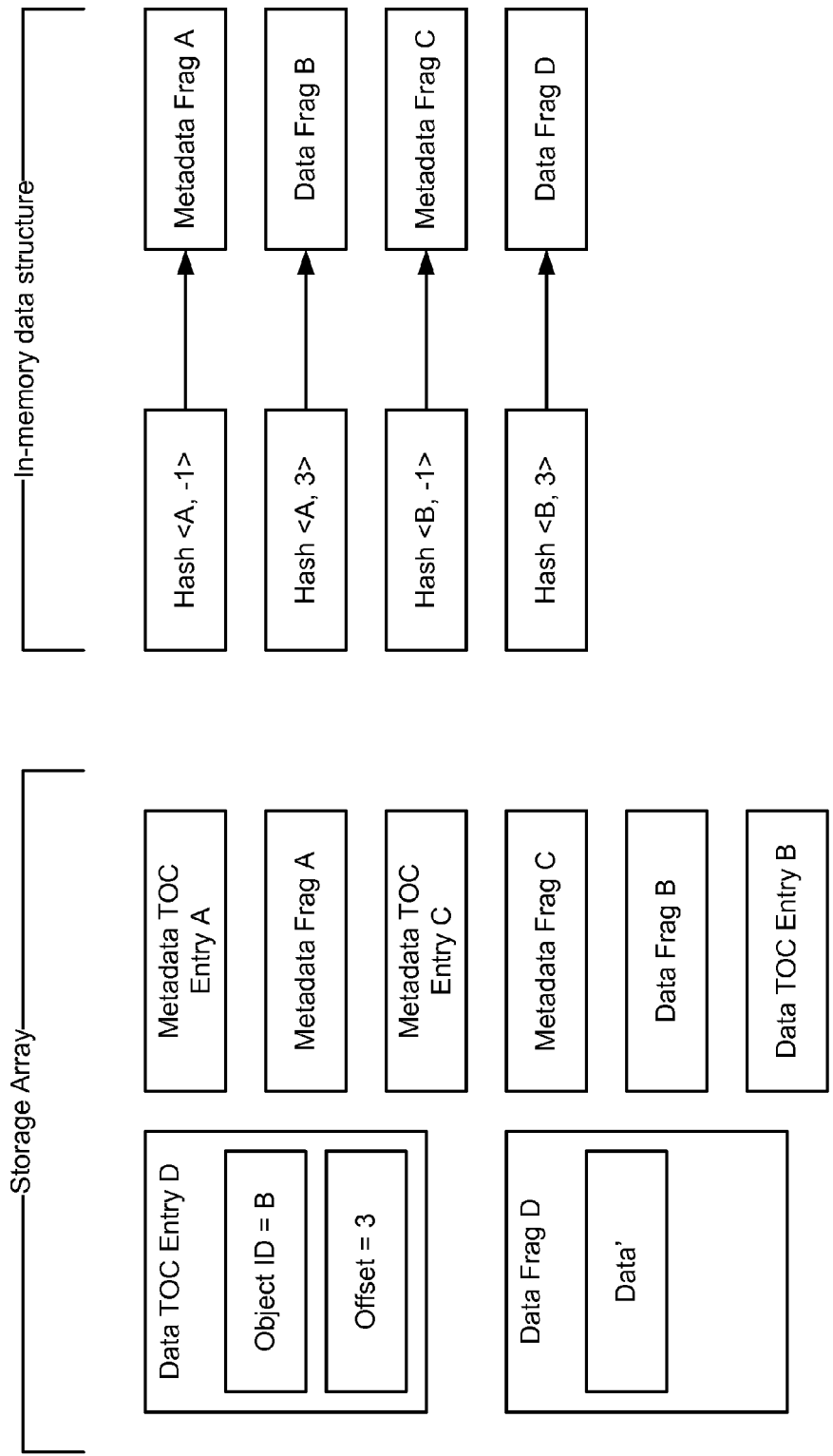

Referring to FIG. 6C, consider a scenario in which a write request for the transaction is subsequently received and processed. The result of servicing the write request is a data frag D with data (Data') and a corresponding data TE (data TOC entry D) specifying object ID=B and offset=3. A corresponding entry for data frag D is also created and stored in the in-memory data structure. At this stage, four items in the storage array may be accessed via the corresponding entries in the in-memory data structure.

Figure 6D:
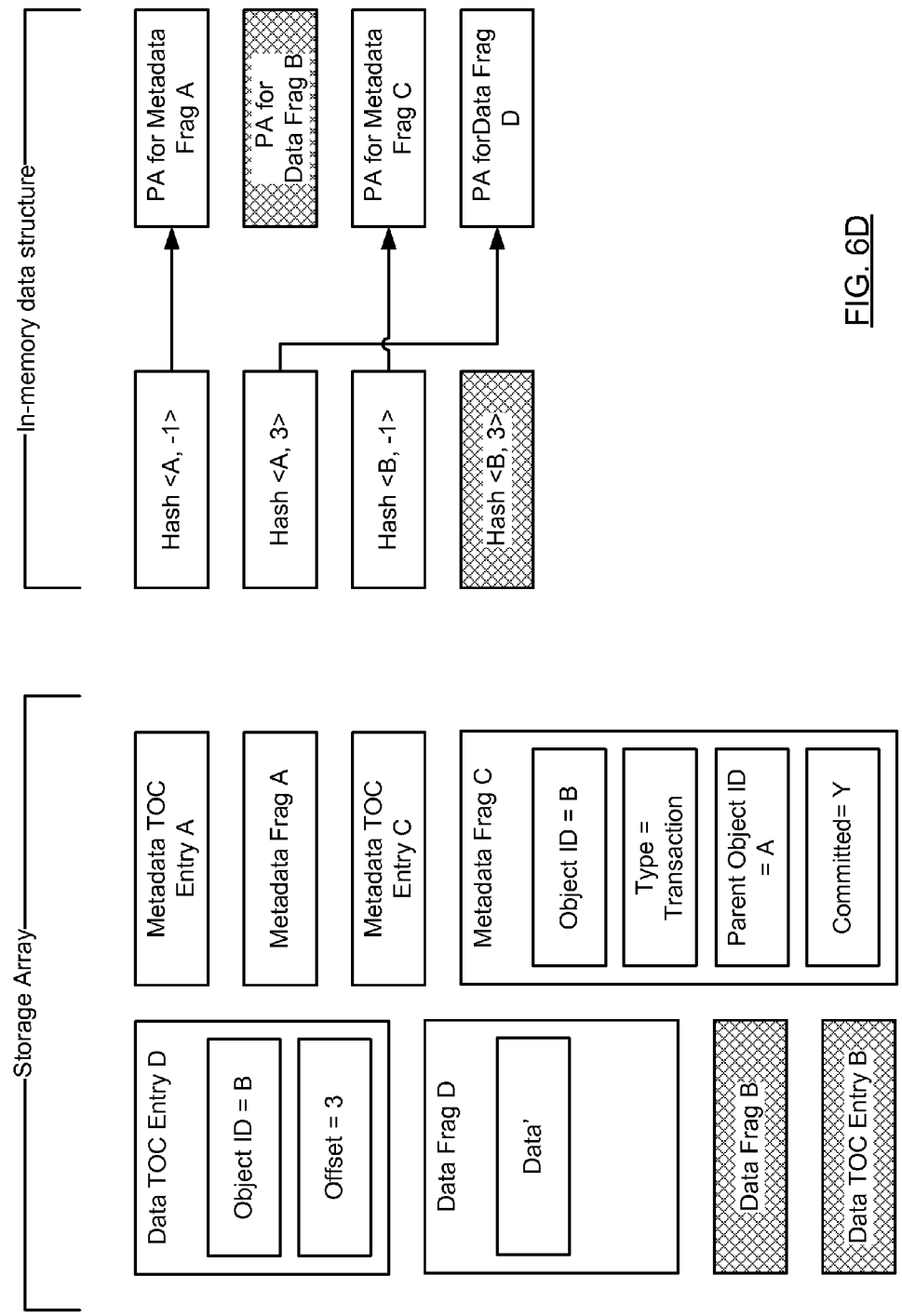

Referring to FIG. 6D, after the write request is received and processed as described above with respect to FIG. 6C, assume that a commit request including object ID=B is received. At this stage, the transaction is committed. Committing the transaction, as shown in the example, may include (i) updating or creating a new metadata frag C that specifies that the transaction corresponding to object ID=B is committed; (ii) invaliding data frag B and data TOC entry B; and (iii) updating the in-memory data structure to associate hash<A, 3> with the physical address of data frag D.

FIGS. 7A-7D show an example in accordance with one or more embodiments of the invention. The example is not intended to limit the scope of the invention.

Figure 7A:
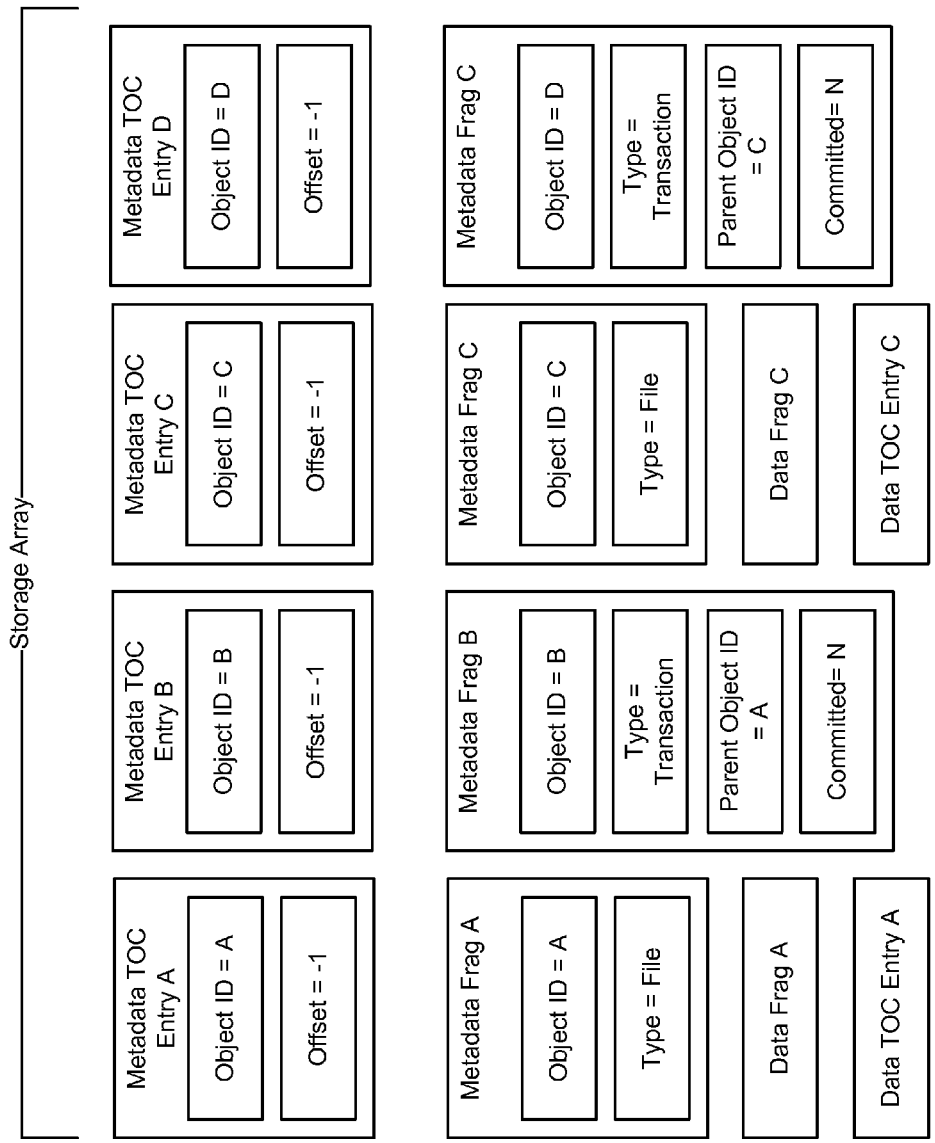
FIGS. 7A-7D show an example in accordance with one or more embodiments of the invention.
Figure 7B:
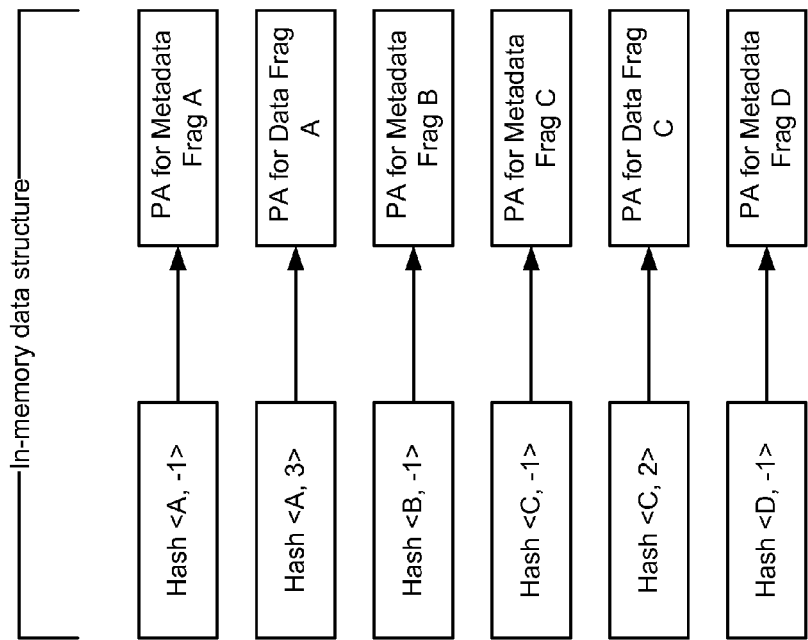

Consider the scenario in which there are two transactions one associated with each of the following transaction objects—object ID=B and object ID=D. Further, assume that the parent object ID for transaction associated with object ID=B is object ID=A and that the parent object ID for transaction associated with object ID=D is object ID=C. Finally, assume that there is data (in the form of data frags) associated with each of object ID=A and object ID=C. FIG. 7A shows the content of the storage array based on the above assumptions. Further, FIG. 7B shows the content of the in-memory data structures based on the above assumptions.

Figure 7C:
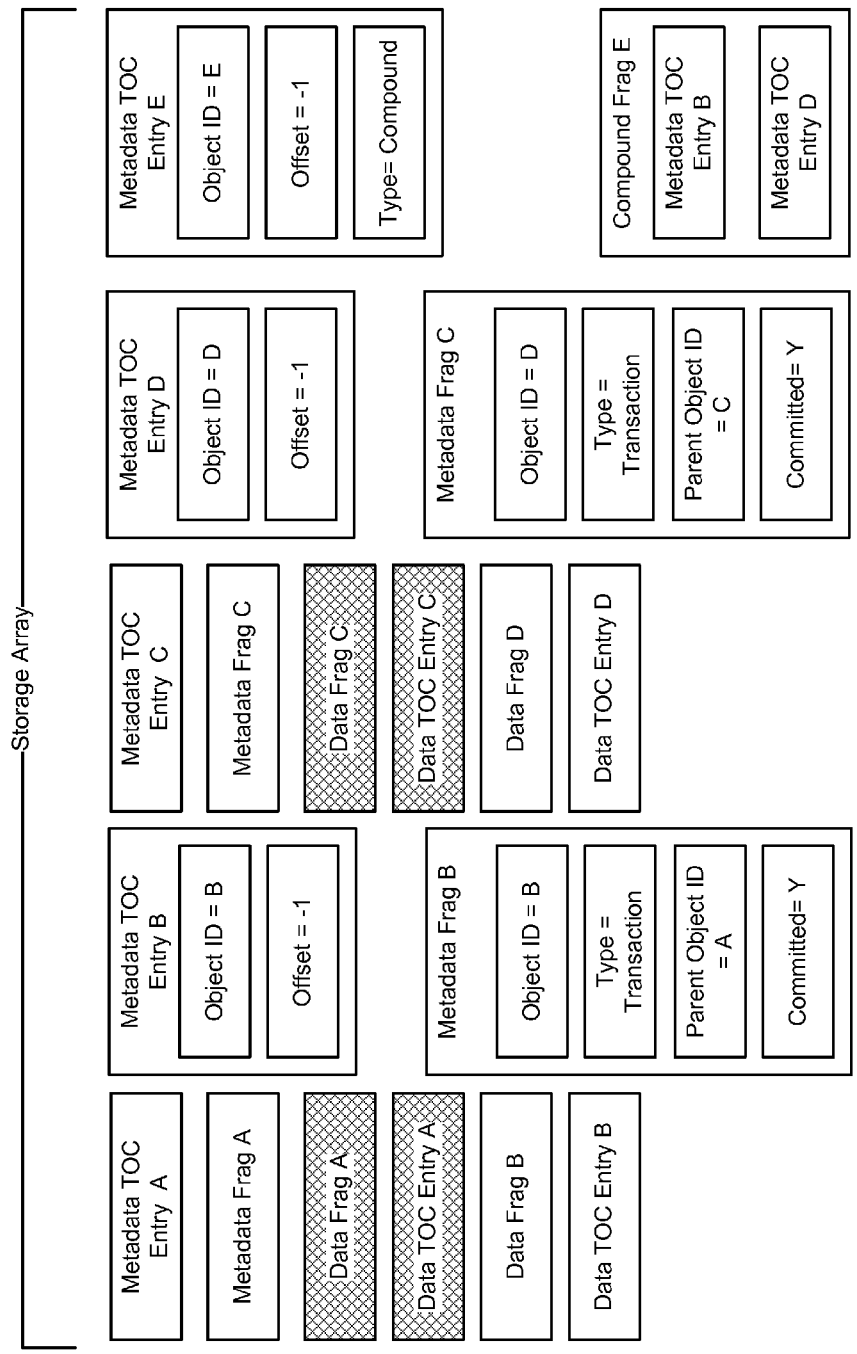
Figure 7D:
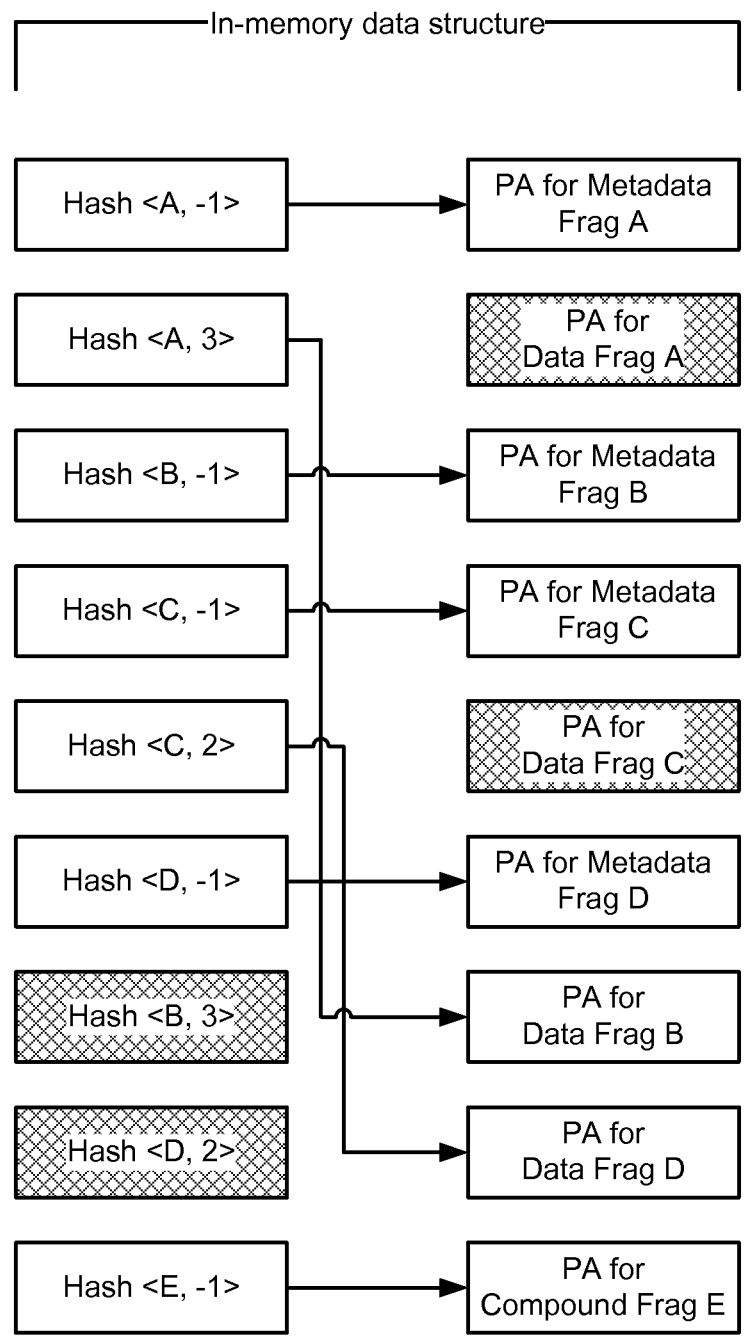

Assume that a write request is serviced for each of the aforementioned transactions resulting in two additional data TEs (data TOC entry B and data TOC entry D) and two additional data frags (data frag B and data frag D) being stored in the storage array, where data frag B is associated with the same offset as data frag A and data frag D is associated with the same offset as data frag C. In addition, assume that after both the write requests have been serviced, a commit request specifying object ID=B and object ID=D is received. The commit request is subsequently serviced by creating and storing a compound frag and corresponding MD TE (metadata TOC entry E) in the storage array. Finally, data frag A, data TOC entry A, data frag C, and data TOC entry C are invalidated in the storage array; invalidating the corresponding hash entries in the in-memory data structure. FIG. 7C shows the content of the storage array based on the above assumptions. Further, FIG. 7D shows the content of the in-memory data structures based on the above assumptions.

In one embodiment of the invention, the initial in-memory data structure may be generated by reading in all of the metadata TOC entries and corresponding frags (i.e., metadata frags or compound frags). Once this data is obtained, the storage controller (or a related process) will be able to "replay" the transactions by reviewing the information in the metadata frags and compound frags to re-generate the last state of the in-memory data structure. In particular, if a given MD frag indicates that the object is a transaction (or transaction object) and that the transaction is not committed, then the data frags associated with the transaction (i.e., data frags corresponding with TEs specifying the transaction object ID) are not used to create entries in the in-memory data structure. Further, when a compound frag is identified, the storage controller (or related process) recursively processes the metadata TEs in the compound frag.

In one embodiment of the invention, the in-memory data structure is generated prior to any operations (e.g., read operation, a write operation, and/or an erase operation) being performed on any datum stored in the solid-state memory modules.

Those skilled in the art will appreciate that while the invention has been described with respect to the last page in each block being reserved as a TOC page, embodiments of the invention may be implemented by setting another page in the block as a reserved TOC page without departing from the invention.

While embodiments of the invention have been described with respect to an implementation on solid-state memory devices, embodiments of the invention may be implemented using another type(s) of storage device(s) without departing from the invention.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor, perform a method, the method comprising:

creating a transaction object for a transaction, wherein the transaction object is identified by a transaction object ID (TOI) and associated with an object identified by an object ID (OID);

storing, in persistent storage, a first table of contents entry (TE) and a metadata (MD) frag for the transaction object, wherein the first TE references the MD frag and the MD frag identifies the object;

receiving a write request to write data to the transaction object as part of the transaction, wherein the write request specifies the TOI and an offset;

in response to the write request:
storing, in the persistent storage, a second TE and a data frag, wherein the second TE specifies the TOI and offset, and wherein the second TE references the data frag and the data frag comprises the data;
storing, in an in-memory data structure, an entry comprising a hash value and a physical address of the data frag, wherein the hash value is derived from the TOI and the offset;

receiving a commit request to commit the transaction;
in response to the commit request:
storing, in persistent storage, a third TE and a second metadata (MD) frag for the transaction object, wherein third TE references the second MD frag, wherein the second MD frag identifies the object and specifies that the transaction is committed;
updating, in the in-memory data structure, a second entry comprising a second hash value and a second physical address for a second data frag to replace the second physical address with the physical address, wherein the second hash value is derived from the OID and the offset.

2. The non-transitory computer readable medium of claim 1, wherein prior to the commit request being processed, data in the object is accessible using the OID and the offset and the data in the data frag associated with the transaction, but not committed, is accessible using the TOI and the offset.

3. The non-transitory computer readable medium of claim 2, wherein after the commit request is processed, the data in the data frag is accessible using the OID and the offset and second data in the second data frag is not accessible.

4. The non-transitory computer readable medium of claim 1, wherein the persistent storage is solid-state memory.

5. The non-transitory computer readable medium of claim 1, wherein the commit request specifies the TOI and does not specify the OID.

6. The non-transitory computer readable medium of claim 1, wherein storing the TE comprises storing the TE in a table of contents (TOC) page in the persistent storage.

7. The non-transitory computer readable medium of claim 1, wherein TE and the MD frag are stored in separate pages in a block in the persistent storage.

8. The non-transitory computer readable medium of claim 1, wherein the MD frag identifies the object using the OID.

9. The non-transitory computer readable medium of claim 1, wherein prior to processing the commit request, the MD frag specifies that the transaction is not committed.

10. The non-transitory computer readable medium of claim 1, wherein the TE includes a third offset equal to −1.

11. A non-transitory computer readable medium comprising instructions, which when executed by a processor, perform a method, the method comprising:

receiving a write request to write data as part of a transaction, wherein the write request specifies a transaction object ID (TOI) for a transaction object and an offset, and wherein the TOI is associated with an object identified by an object ID (OID);

in response to the write request:

storing, in persistent storage, a first TE and a data frag, wherein TE specifies the TOI and the offset, wherein the first TE references the data frag and the data frag comprises the data;

storing, in an in-memory data structure, an entry comprising a hash value and a physical address of the data frag, wherein the hash value is derived from the TOI and the offset;

receiving a second write request to write second data as part of a second transaction, wherein the second write request specifies the second TOI for a second transaction object and a second offset and wherein the second TOI is associated with a second object identified by a second OID;

in response to the second write request:

storing, in the persistent storage, a second TE and a second data frag, wherein second TE specifies the second TOI and the second offset, wherein the second TE references the second data frag and the second data frag comprises the second data;

storing, in an in-memory data structure, a second entry comprising a second hash value and a second physical address of the second data frag, wherein the second hash value is derived from the second TOI and the second offset;

receiving a commit request, wherein the commit request comprises the TOI and the second TOI;

in response to the commit request:

storing, in persistent storage, a third TE and a compound frag, wherein third TE references the compound frag, wherein the compound frag comprises a fourth TE and a fifth TE, wherein the fourth TE references a MD frag, wherein the MD frag identifies the TOI and specifies that the transaction is committed, wherein the fifth TE references a second MD frag, wherein the second MD frag identifies the second TOI and specifies that the second transaction is committed;

updating, in the in-memory data structure, a third entry comprising a third hash value and a third physical address for a third data frag to replace the third physical address with the physical address, wherein the third hash value is derived from the OID and the offset;

updating, in the in-memory data structure, a fourth entry comprising a fourth hash value and a fourth physical address for a fourth data frag to replace the fourth physical address with the second physical address, wherein the fourth hash value is derived from the second OID and the second offset.

12. The non-transitory computer readable medium of claim 11, the method further comprising:

prior to receiving the write request:

creating the transaction object;

storing, in the persistent storage, a sixth TE and a third MD frag for the transaction object, wherein the sixth TE references the third MD frag and the third MD frag identifies the object;

creating the second transaction object;

storing, in the persistent storage, a seventh TE and a fourth MD frag for the second transaction object, wherein the seventh TE references the fourth MD frag and the fourth MD frag identifies the second object.

13. The non-transitory computer readable medium of claim 11, wherein the compound frag is stored in a frag page.

14. The non-transitory computer readable medium of claim 13, wherein the third TE is stored in a table of contents page.

15. The non-transitory computer readable medium of claim 13, wherein the frag page and the TOC page are stored in a block in the persistent storage.

16. The non-transitory computer readable medium of claim 11, wherein the third TE specifies a type of frag with which the third TE is associated.

17. The non-transitory computer readable medium of claim 11, wherein the third TE comprises a compound object ID and a fifth offset.

18. The non-transitory computer readable medium of claim 11, wherein the fifth offset is −1.

* * * * *